(12) United States Patent
Bian et al.

(10) Patent No.: US 11,125,944 B2
(45) Date of Patent: Sep. 21, 2021

(54) POLARIZER WITH MULTIPLE EVANESCENTLY COUPLED WAVEGUIDES

(71) Applicant: GLOBALFOUNDRIES U.S. Inc., Malta, NY (US)

(72) Inventors: Yusheng Bian, Ballston Lake, NY (US); Ajey Poovannummoottil Jacob, Watervliet, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 0 days.

(21) Appl. No.: 16/741,792

(22) Filed: Jan. 14, 2020

(65) Prior Publication Data
US 2021/0215873 A1     Jul. 15, 2021

(51) Int. Cl.
| G02B 6/126 | (2006.01) |
| G02B 6/13 | (2006.01) |
| G02B 6/125 | (2006.01) |
| G02B 6/12 | (2006.01) |

(52) U.S. Cl.
CPC ............ *G02B 6/126* (2013.01); *G02B 6/125* (2013.01); *G02B 6/13* (2013.01); *G02B 2006/12147* (2013.01)

(58) Field of Classification Search
None
See application file for complete search history.

(56) References Cited

U.S. PATENT DOCUMENTS

| 6,320,992 B1 * | 11/2001 | Goldner ............. G01P 15/0802 385/13 |
| 8,253,933 B2 * | 8/2012 | Heideman .......... G01N 21/6428 356/226 |
| 9,470,844 B1 | 10/2016 | Ma et al. |
| 10,281,277 B1 * | 5/2019 | Perahia ............. G01C 19/5698 |
| 10,429,582 B1 | 10/2019 | Bian et al. |
| 10,444,433 B1 | 10/2019 | Bian et al. |
| 2011/0295511 A1 * | 12/2011 | Sanders ............ G01N 21/7746 702/19 |

(Continued)

OTHER PUBLICATIONS

Bauters et al., "Planar Waveguides with Less than 0.1 dB/m Propagation Loss Fabricated with Wafer Bonding," Optics Express, vol. 19, No. 24, 2011, pp. 24090-24101.
Bian et al., "Hybrid Vanadate Waveguiding Configurations for Extreme Optical Confinement and Efficient Polarization Management in the 'Near-Infrared'," The Royal Society of Chemistry, Nanoscale, 2018, pp. 16667-16674.

(Continued)

*Primary Examiner* — Tina M Wong
(74) *Attorney, Agent, or Firm* — Gibb & Riley, LLC; Francois Pagette

(57) ABSTRACT

Disclosed are embodiments of an on-chip polarizer and of methods of forming the polarizer. The polarizer includes first and second waveguides with different shapes at different design levels above a substrate. The first waveguide has a main body between an input end and an output end. The second waveguide is spiral in shape with an inner end and with an outer end that is evanescently coupled to the main body of the first waveguide. Light signals, including first light signals with a first type polarization and second light signals with a second type polarity, are received at the input end of the first waveguide. The first waveguide passes the first light signals to the output end and passes at least some second light signals out the main body and into the outer end of the second waveguide. The second waveguide attenuates the received second light signals.

20 Claims, 10 Drawing Sheets

(56) References Cited

U.S. PATENT DOCUMENTS

2019/0020169 A1* 1/2019 Liew .................... H01S 3/0941

OTHER PUBLICATIONS

Chen et al., "Spiral Bragg Grating Waveguides for TM Mode Silicon Photonics," Optics Express, vol. 23, No. 19, 2015, pp. 25295-25307.

Dai et al., "Compact Broadband Polarizer Based on Shallowly-Etched Silicon-on-Insulator Ridge Optical Waveguides," Optics Express, vol. 18, No. 26, 2010, pp. 27404-27415.

Giewont et al., "300-mm Monolithic Silicon Photonics Foundry Technology," IEEE Journal of Selected Topics in Quantum Electronics, vol. 25, No. 5, 2019, pp. 1-12.

Lee et al., "Back-End Deposited Silicon Photonics for Monolithic Integration on CMOS," IEEE Journal of Selected Topics in Quantum Electronics, vol. 19, No. 2, 2013, pp. 1-7.

Huang et al., "CMOS Compatible Horizontal Nanoplasmonic Slot Waveguides TE-Pass Polarizer on Silicon-on-Insulator Platform," Optics Express, vol. 21, No. 10, 2013, pp. 12790-12796.

Redding et al., "Evanescently Coupled Multimode Spiral Spectrometer," Optical Society of America, Optica vol. 3, No. 9, 2016, pp. 956-962.

Sun et al., "Experimental Demonstration of a Hybrid Plasmonic Transverse Electric Pass Polarizer for a Silicon-on-Insulator Platform," Optics Express, vol. 37, No. 23, 2012, pp. 4814-4816.

Zafar et al., "Compact Silicon TE-Pass Polarizer Using Adiabatically-Bent Fully-Etched Waveguides," Optics Express, vol. 26, No. 24, pp. 31850-31860.

* cited by examiner

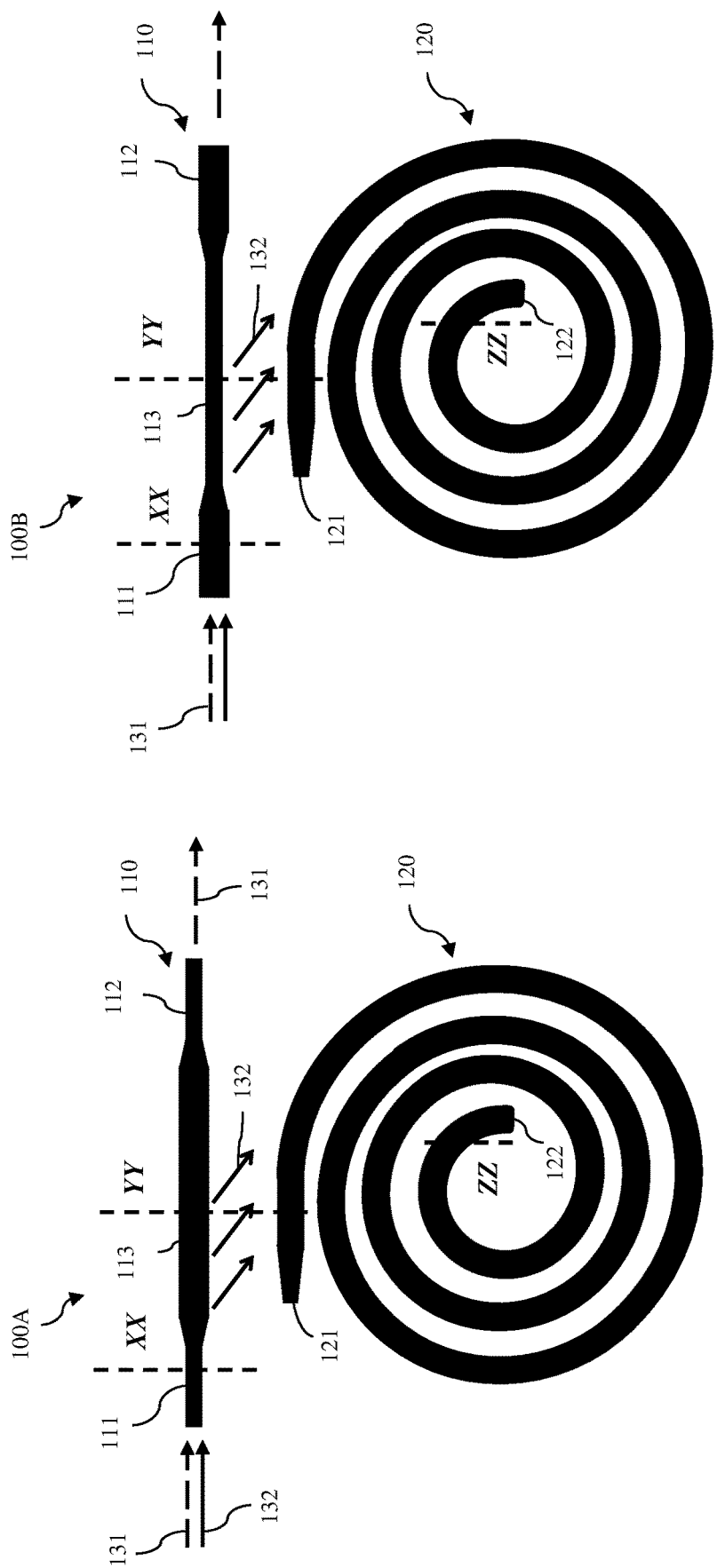

POLARIZER WITH MULTIPLE EVANESCENTLY COUPLED WAVEGUIDES

BACKGROUND

Field of the Invention

The present invention relates to on-chip transverse electric (TE)-pass and transverse magnetic (TM)-pass polarizers.

Description of Related Art

Those skilled in the art will recognize that light is a form of electromagnetic radiation. That is, light includes both electric and magnetic fields, which are perpendicular to one another in free space and which are oriented transverse to the direction of travel (also referred to herein as the direction of propagation) of the light waves. The orientation of the axes of oscillation of the electric field and the magnetic field, respectively, relative to the direction of travel of the light waves are different depending upon the transmission modes of the light waves. These transmission modes include: the transverse-electric and magnetic (TEM) mode, the transverse-electric (TE) mode, and the transverse-magnetic (TM) mode. In the TEM mode both the electric and the magnetic fields are transverse to the direction of travel of the light waves. In the TE mode the electric field is transverse to the direction of travel of the light waves, while the magnetic field is normal to the direction of travel of the light waves. In the TM mode, the magnetic field is transverse to the direction of travel of the light, while the electric field is normal to the direction of travel of the light waves.

Light waves in TE mode and light waves in the TM mode are referred to as light waves having different types of polarizations. Opto-electronics are typically designed to operate with light in one of these different polarizations (i.e., in either the TE mode or the TM mode). Therefore, on-chip polarizers are often employed to filter out one type of polarized light or the other. That is, a TM-pass polarizer is often employed to filter out TE polarized light and a TE-pass polarizer is often employed to filter out TM polarized light. Such a TE or TM-pass polarizer typically incorporates a waveguide with multiple turns. In this case, one type of polarized light or the other is gradually filtered out as light passes from one end of the waveguide, through the various turns, and to the opposite end. To adequately filter TE or TM polarized light in this manner, the distance between the ends of the waveguide must be relatively long. Thus, conventional TE or TM-pass polarizers have relatively large footprints (i.e., consume a large amount of chip area).

SUMMARY

Generally, disclosed herein are embodiments of a photonic integrated circuit (PIC) chip with an on-chip polarizer. In each of the embodiments, the PIC chip can include a substrate and a polarizer on the substrate. The polarizer can include at least two differently shaped waveguides at different design levels above the substrate (e.g., in the active device level and in a metal level above the active device level). The waveguides can include a first waveguide with an input end, an output end opposite the input end and an elongated main body extending between the input end and the output end. The waveguides can also include a second waveguide, which is spiral in shape with an inner end and an outer end. The outer end of the second waveguide can be evanescently coupled to the main body of the first waveguide. With this configuration, light signals, including first light signals with a first type polarization and second light signals with a second type polarity, can be received at the input end of the first waveguide. The first waveguide can pass the first light signals through the main body to the output end. The first waveguide can further pass at least a portion of the second light signals out the main body and into the outer end of the second waveguide. Finally, the second waveguide can attenuate the received second light signals as they pass from its outer end toward its inner end.

As discussed further in the detailed description section, multiple different polarizer embodiments are disclosed and these embodiments vary with respect to the design levels at which the first and second waveguides are located, with respect to the relative thickness and/or shape of the main body of the first waveguide, with respect to the numbers and locations of the first and/or second waveguides, with respect to the type of polarized light filtered out of the first waveguide by the second waveguide, etc.

For example, in one specific embodiment, the on-chip polarizer can include multiple differently shaped waveguides at different design levels (e.g., in the active device level and in a metal level above the active device level). These waveguides can include a first waveguide with an input end, an output end opposite the input end and an elongated main body extending between the input end and the output end. The waveguides can also include second waveguides on opposing sides of the first waveguide. Each second waveguide can be spiral in shape with an inner end and an outer end. The outer end of each second waveguide can be evanescently coupled to the main body of the first waveguide. With this configuration, light signals, including first light signals with a first type polarization and second light signals with a second type polarity, can be received at the input end of the first waveguide. The first waveguide can pass the first light signals through the main body to the output end. The first waveguide can further pass at least a portion of the second light signals out the main body and into the outer end of each second waveguide. Finally, each second waveguide can attenuate the received second light signals as they pass from its outer end toward its inner end.

Also disclosed herein are embodiments of a method of forming the above described photonic integrated circuit (PIC) chip with an on-chip polarizer. The method embodiments can include providing a substrate and forming, on the substrate, a polarizer that has at least two differently shaped waveguides at different design levels (e.g., in the active device level and in a metal level above the active device level). Specifically, forming the polarizer can include forming multiple waveguides such that the waveguides include both a first waveguide and a second waveguide. The first waveguide can be formed so as to have an input end, an output end opposite the input end and an elongated main body extending between the input end and the output end. The second waveguide can be formed so as to be spiral in shape with an inner end and an outer end. The forming of the multiple waveguides can further be performed such that the outer end of the second waveguide is evanescently coupled to the main body of the first waveguide.

Forming the polarizer in this manner ensures that, when light signals, including first light signals with a first type polarization and second light signals with a second type polarity, are received at the input end of the first waveguide, the first waveguide passes the first light signals through the main body to the output end, the first waveguide passes at least a portion of the second light signals out the main body and into the outer end of the second waveguide and the second waveguide attenuates the received second light signals as they pass from its outer end toward its inner end.

As discussed further in the detailed description section, multiple different method embodiments for forming the polarizer are disclosed and these method embodiments vary with respect to the design levels at which the first and second waveguides are formed, with respect to patterning the first waveguide, with respect to the numbers and locations of the first and/or second waveguides, with respect to the type of polarized light filtered out of the first waveguide by the second waveguide, etc.

BRIEF DESCRIPTION OF THE SEVERAL VIEWS OF THE DRAWINGS

The present invention will be better understood from the following detailed description with reference to the drawings, which are not necessarily drawn to scale and in which:

FIGS. 6A-6H are top-down diagrams each illustrating, specifically, a disclosed embodiment of the PIC chip with an on-chip polarizer.

DETAILED DESCRIPTION

As mentioned above, opto-electronics are typically designed to operate with either transverse electric (TE) polarized light or transverse magnetic (TM) polarized light. Therefore, on-chip polarizers are often employed to filter out one type of polarized light or the other. That is, a TM-pass polarizer is often employed to filter out TE polarized light and a TE-pass polarizer is often employed to filter out TM polarized light. Such a TE or TM-pass polarizer typically incorporates a waveguide with multiple turns. In this case, one type of polarized light or the other is gradually filtered out as light passes from one end of the waveguide, through the various turns, to the opposite end of the waveguide. To adequately filter TE or TM polarized light in this manner, the distance between the ends of the waveguide must be relatively long. Thus, conventional TE or TM-pass polarizers have relatively large footprints (i.e., consume a large amount of chip area).

In view of the foregoing, disclosed herein are embodiments of a photonic integrated circuit (PIC) chip with an on-chip polarizer. In each of the embodiments, the PIC chip can include a substrate and a polarizer on the substrate. The polarizer can include at least two differently shaped waveguides at different design levels above the substrate (e.g., in the active device level and in a metal level above the active device level). The waveguides can include a first waveguide with an input end, an output end opposite the input end and an elongated main body extending between the input end and the output end. The waveguides can also include a second waveguide, which is spiral in shape with an inner end and an outer end. The outer end of the second waveguide can be evanescently coupled to the main body of the first waveguide. With this configuration, light signals, including first light signals with a first type polarization and second light signals with a second type polarity, can be received at the input end of the first waveguide. The first waveguide can pass the first light signals through the main body to the output end. The first waveguide can further pass at least a portion of the second light signals out the main body and into the outer end of the second waveguide. Finally, the second waveguide can attenuate the received second light signals as they pass from its outer end toward its inner end. Also disclosed herein are method embodiments for forming the PIC chip with an on-chip polarizer.

Figure 1:
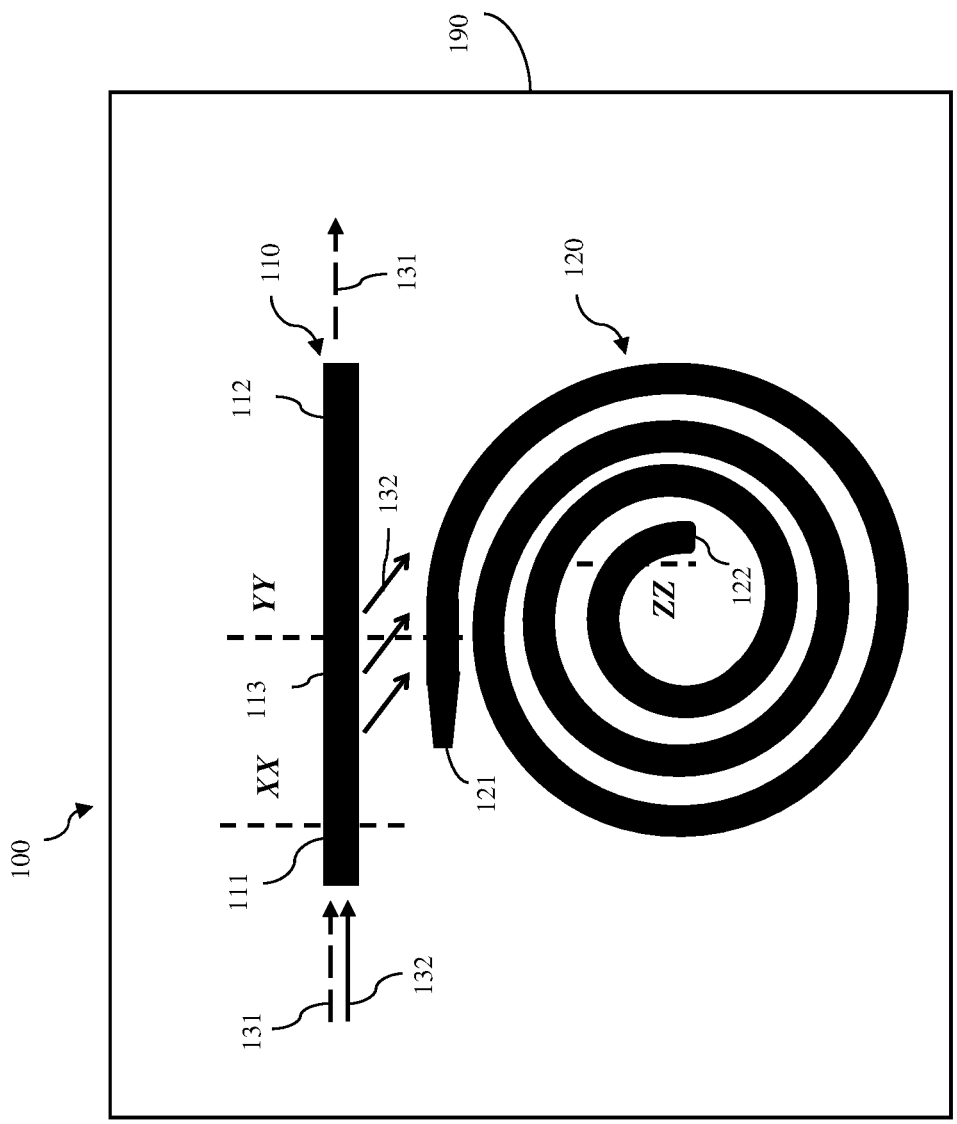
FIG. 1 is a top-down diagram illustrating, generally, disclosed embodiments of a photonic integrated circuit (PIC) chip with an on-chip polarizer.

Specifically, FIG. 1 is a top-down view generally illustrating the disclosed embodiments of a photonic integrated circuit (PIC) chip with an on-chip polarizer 100. In each of the embodiments, the PIC chip can include a substrate 190 and a polarizer 100 on the substrate 190. The polarizer 100 can include at least two differently shaped waveguides at different design levels (as discussed in greater detail below) above the substrate 190. The waveguides can include a first waveguide 110 (also referred to herein as a bus waveguide) with an input end 111, an output end 112 opposite the input end 111 and an elongated main body 113 extending between the input end 111 and the output end 112 on a flat plane in one design level. The waveguides can also include a second waveguide 120 (also referred to herein as a filter/attenuator waveguide), which is spiral in shape with an outer end 121 and an inner end 122. That is, the second waveguide can include a gradually tightening curve from an outer end to an inner end (or center point) on a flat plane in a design level above or below the design level containing the first waveguide 110. The outer end 121 of the second waveguide 120 can further be diagonally offset from and evanescently coupled to the main body 113 of the first waveguide 110. With this configuration, light signals, including first light signals 131 with a first type polarization and second light signals 132 with a second type polarity, can be received at the input end 111 of the first waveguide 110. The first waveguide 110 can pass the first light signals 131 through the main body 113 to and out the output end 112. However, due to the evanescent coupling, the first waveguide 110 can pass at least a portion of the second light signals 132 out the main body 113 and into the outer end 121 of the second waveguide 120. That is, the second waveguide 120 can filter out the second light signals 132 from the first waveguide 110. Finally, the second waveguide 120 can attenuate the received second light signals 132 as they pass from its outer end 121 toward its inner end 122.

Multiple different polarizer embodiments are disclosed and these embodiments can vary with respect to the design levels at which the first and second waveguides are located.

More specifically, as mentioned above, the differently shaped waveguides in the polarizer 100 can be at different design levels above the substrate 190. Those skilled in the art will recognize that the design levels of a PIC chip include: front end of the line (FEOL) design levels; a middle of the line (MOL) design level above the FEOL design levels; and back end of the line (BEOL) design levels above the MOL design level. The FEOL design levels typically include an active device level, which incorporates a monocrystalline semiconductor layer, such as in a monocrystalline silicon layer, for active device formation, and also a polysilicon level, which incorporates a polysilicon layer for gate formation and/or for passive device formation. The MOL design level typically includes dielectric material layers (e.g., layers of silicon nitride, silicon oxide, etc.) over FEOL devices and contacts that extend through the dielectric material layers to the FEOL devices. The BEOL design levels typically refer to metal levels, which incorporate interlayer dielectric (ILD) layers (e.g., layers of silicon oxide, silicon nitride, or any other suitable ILD material, such as borophosphosilicate glass (BPSG), tetraethyl orthosilicate (TEOS), fluorinated tetraethyl orthosilicate (FTEOS), etc., and metal wires and vias patterned within the ILD layers in order to provide electrical connections between on-chip devices as well as electric connections to off-chip components. In the disclosed embodiments, the first waveguide 110 can be at one of these design levels and the second waveguide 120 can be at a different one of these design levels, which is either above or below the design level that contains the first waveguide 110.

Figure 2A:
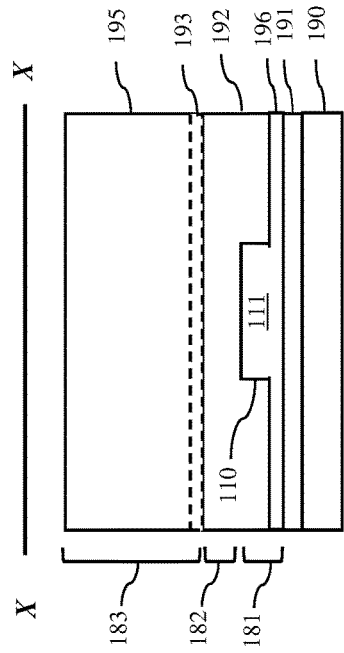
FIGS. 2A-2C is a set of cross-section diagrams XX, YY and ZZ for the polarizer shown in FIG. 1.
Figure 2B:
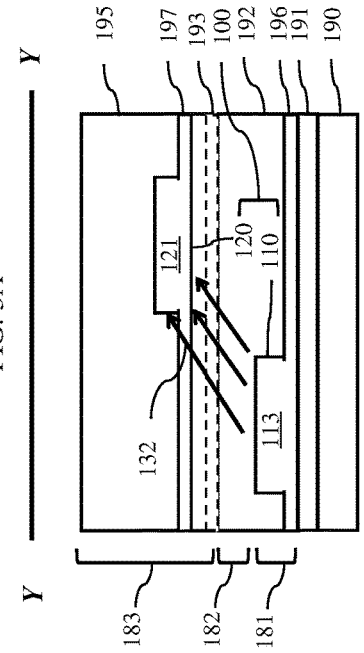
Figure 2C:
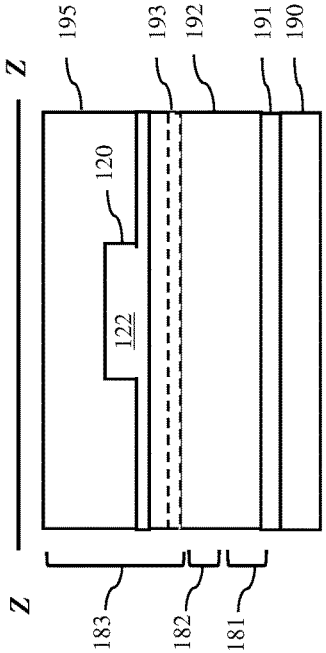

In some embodiments, as shown in the XX, YY and ZZ cross-sections in FIGS. 2A-2C (or alternatively in the XX, YY and ZZ cross-sections of FIGS. 3A-3C), the PIC chip could include a substrate 190 (e.g., a silicon substrate), an insulator layer 191 (e.g., a buried oxide (BOX) layer) on the substrate 190, and a polarizer 100 above the insulator layer 191. In these embodiments, the first waveguide 110 can be in a FEOL design level 181 and, particularly, in an active device level and the second waveguide 120 can be in a BEOL design level 183 and, particularly, in one of the metal levels above the active device level.

Figure 3A:
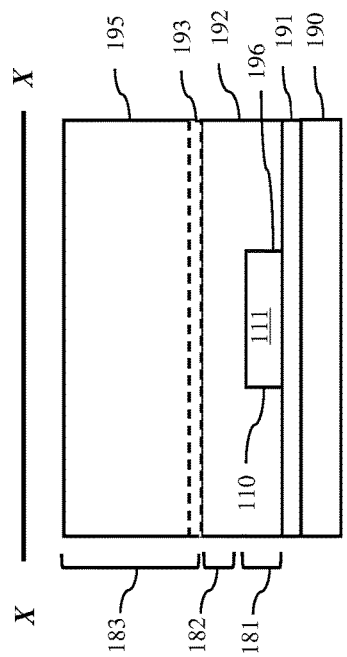
FIGS. 3A-3C is an alternative set of cross-section diagrams XX, YY and ZZ for the polarizer shown in FIG. 1.
Figure 3B:
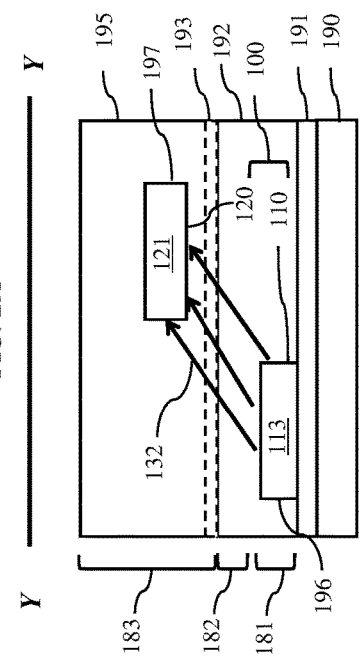

Specifically, as mentioned above, the first waveguide 110 can include an input end 111, an output end, and the main body 113 that extends from the input end 111 and to the output end on a flat plane. In these embodiments, the first core of the first waveguide 110 can be a patterned portion of a semiconductor layer 196 (e.g., a monocrystalline silicon layer) in the active device level. As illustrated in FIGS. 2A-2B, the patterned portion of the semiconductor layer 196 that forms the first core of the first waveguide 110 can extend the full thickness of the semiconductor layer 196. Alternatively, as illustrated in FIGS. 3A-3B, the patterned portion of the semiconductor layer 196 that forms the first core of the first waveguide 110 can extend only partially into the semiconductor layer 196 such that relatively thin portions of the semiconductor layer 196 extend laterally beyond the first core. The first cladding material surrounding the first core can be the insulator material of the insulator layer 191 adjacent to the bottom surface of the first core and also the dielectric material layers 192 of the MOL design level 182 adjacent to the top and side surfaces of the first core.

Figure 3C:
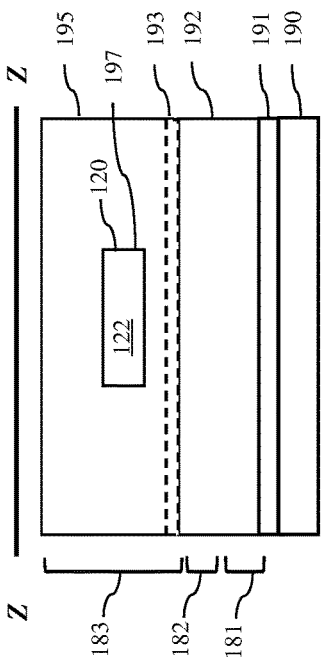

The second waveguide 120 can be spiral in shape with a gradually tightening curve from an outer end 121 to an inner end 122 (or center point) on a flat plane in a design level. In these embodiments, the second core of the second waveguide 120 can be a patterned portion of one specific BEOL ILD layer 197 (e.g., a silicon nitride layer) of the various different BEOL ILD layers 195 in a BEOL metal level. As illustrated in FIGS. 2B-2C, the patterned portion of the ILD layer 197 that forms the second core of the second waveguide 120 can extend the full thickness of the ILD layer 197. Alternatively, as illustrated in FIGS. 3B-3C, the patterned portion of the ILD layer 197 that forms the second core of the second waveguide 120 can extend only partially into the ILD layer 197 such that relatively thin portions of the ILD layer 197 extend laterally beyond the second core. The second cladding material surrounding the second core can be one or more different ILD layers (e.g., silicon oxide layers) adjacent to the bottom, top and side surfaces of the second core. As illustrated in FIG. 2B (or FIG. 3B), the outer end 121 of the second waveguide 120 can further be diagonally offset from and evanescently coupled to the main body 113 of the first waveguide 110 so that second light signals 132 with the second type polarization can pass from the main body 113 of the first waveguide 110 to the outer end 121 of the second waveguide 120. Thus, when first and second light signals 131-132 having both the first and second type polarizations are received at the input end 111 of the first waveguide 110, for the most part, only the first light signals 131 pass entirely through the first waveguide 110 from the input end 111 to the output end 112 (as shown in FIG. 1). Due to evanescent coupling, the second waveguide 120 filters out and attenuates the second light signals 132 having the second type polarization.

Figure 4A:
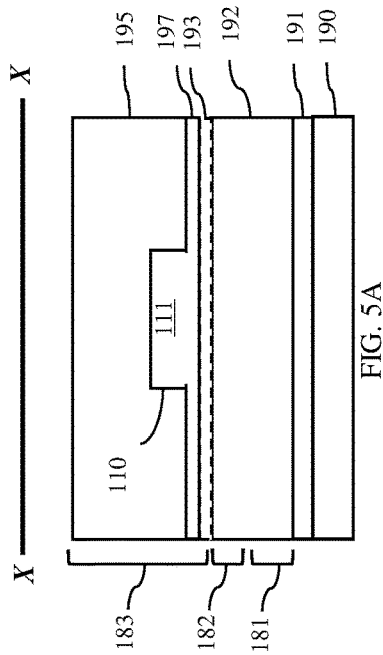
FIGS. 4A-4C is another alternative set of cross-section diagrams XX, YY and ZZ for the polarizer shown in FIG. 1.
Figure 4B:
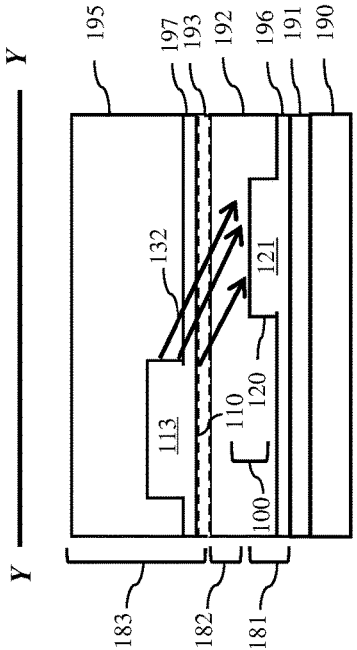
Figure 4C:
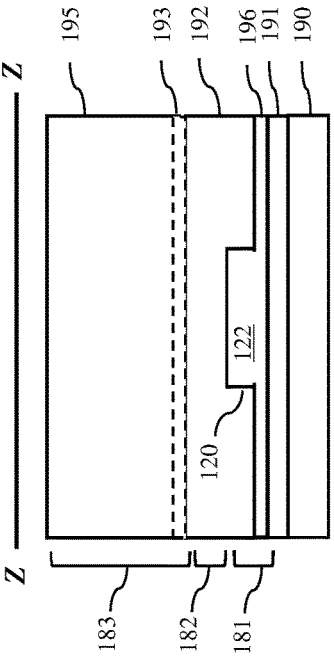

In other embodiments, as shown in the XX, YY and ZZ cross-sections in FIGS. 4A-4C (or alternatively in the XX, YY and ZZ cross-sections of FIGS. 5A-5C), the PIC chip could similarly include a substrate 190 (e.g., a silicon substrate), an insulator layer 191 (e.g., a buried oxide (BOX) layer) on the substrate 190, and a polarizer 100 above the insulator layer 191. However, in these embodiments, the first waveguide 110 could be in a BEOL design level 183 and, particularly, in one of the metal levels and the second waveguide 120 could be in a FEOL design level 181 and, particularly, in the active device level.

Figure 5A:
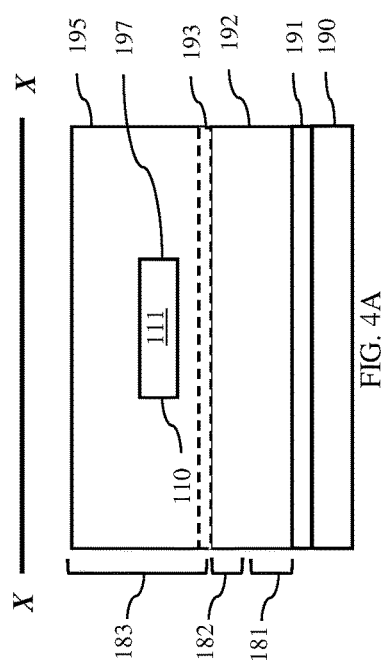
FIGS. 5A-5C is yet another alternative set of cross-section diagrams XX, YY and ZZ for the polarizer shown in FIG. 1.
Figure 5B:
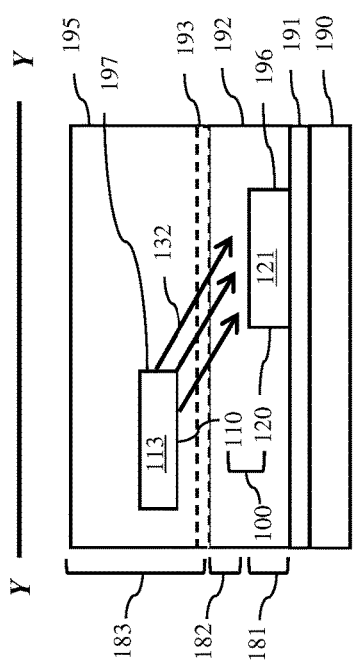

Specifically, as mentioned above, the first waveguide 110 can include an input end 111, an output end, and the main body 113 that extends from the input end 111 and to the output end on a flat plane. In these embodiments, the first core of the first waveguide 110 can be a patterned portion of an ILD layer 197 (e.g., a silicon nitride layer) in a metal level. As illustrated in FIGS. 4A-4B, the patterned portion of the ILD layer 197 that forms the first core of the first waveguide 110 can extend the full thickness of the ILD layer 197. Alternatively, as illustrated in FIGS. 5A-5B, the patterned portion of the ILD layer 197 that forms the first core of the first waveguide 110 can extend only partially into the ILD layer 197 such that relatively thin portions of the ILD layer 197 extend laterally beyond the first core. The first cladding material surrounding the first core can be different ILD layers (e.g., silicon oxide layers) adjacent to the bottom, top and side surfaces of the first core.

Figure 5C:
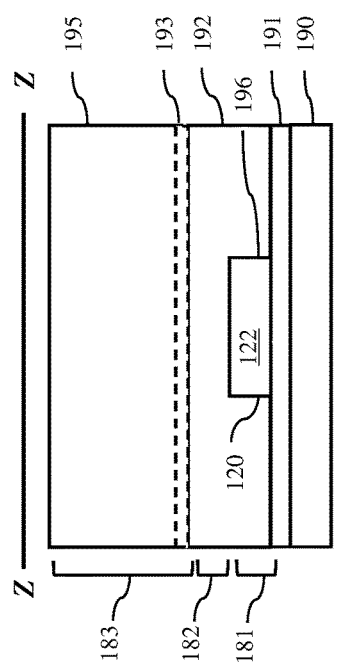

The second waveguide 120 can be spiral in shape with a gradually tightening curve from an outer end 121 to an inner end 122 (or center point) on a flat plane in a design level. In these embodiments, the second core of the second waveguide 120 can be a patterned portion of a semiconductor layer 196 (e.g., a monocrystalline silicon layer) in the active device level. As illustrated in FIGS. 4B-4C, the patterned portion of the semiconductor layer 196 that forms the second core of the second waveguide 120 can extend the full thickness of the semiconductor layer 196. Alternatively, as illustrated in FIGS. 5B-5C, the patterned portion of the semiconductor layer 196 that forms the second core of the second waveguide 120 can extend only partially into the semiconductor layer 196 such that relatively thin portions of the semiconductor layer 196 extend laterally beyond the second core. The second cladding material surrounding the second core can be the insulator material of the insulator layer 191 adjacent to the bottom surface of the second core and also the dielectric material layers 192 of the MOL design level 182 adjacent to the top and side surfaces of the second core. As illustrated in FIG. 4B (or FIG. 5B), the outer end 121 of the second waveguide 120 can further be diagonally offset from and evanescently coupled to the main body 113 of the first waveguide 110 so that second light signals 132 with the second type polarization can pass from the main body 113 of the first waveguide 110 to the outer end 121 of the second waveguide 120. Thus, when first and second light signals 131-132 having both the first and second type polarizations are received at the input end 111 of the first waveguide 110, for the most part, only the first light signals 131 pass entirely through the first waveguide 110 from the input end 111 to the output end 112 (as shown in FIG. 1). Due to evanescent coupling, the second waveguide 120 filters out and attenuates the second light signals 132 having the second type polarization.

Optionally, the embodiments described above and shown in FIGS. 1 and 2A-2C, 3A-3C, 4A-4C, or 5A-5C could further include a relatively thin additional dielectric layer 193 (e.g., a thin silicon nitride layer) stacked between the MOL dielectric material layers 192 and the BEOL ILD layers 195.

Additionally, in the embodiments described above and shown in FIGS. 1 and 2A-2C, 3A-3C, 4A-4C or 5A-5C, the core of one waveguide in the polarizer 100 has been formed from the monocrystalline semiconductor layer 196 (e.g., a monocrystalline silicon layer) in the active device level and the core of another waveguide in the polarizer 100 has been formed from one specific ILD layer 197 (e.g., a silicon nitride layer) of the various different BEOL ILD layers 195 in a BEOL metal level above the active device level. It should be understood that these embodiments are provided for illustration purposes and are not intended to be limiting. Additionally or alternatively, the core of a waveguide in the polarizer could be patterned from a polysilicon layer in the FEOL design levels 181. Additionally or alternatively, the core of a waveguide in the polarizer could be patterned from a different one of the ILD layers in the BEOL design levels 183.

In addition to varying with respect to the different design levels within which the first waveguide and second waveguide are formed, the disclosed embodiments can also vary with respect to the other features. These other features can include, but are not limited to, the relative thickness and/or shape of the main body of the first waveguide, the numbers and locations of the first and/or second waveguides, and the type of polarized light filtered out of the first waveguide by the second waveguide.

For example, in the polarizer 100 of FIG. 1, the first waveguide 110 is shown as having an essentially uniform thickness across its length from the input end 111 to the output end 112 (when viewed from above and in a direction perpendicular to the length of the first waveguide). FIGS. 6A and 6B are top-down views illustrating a photonic integrated circuit (PIC) chip with on-chip polarizers 100A and 100B, respectively. As in the embodiments described above and illustrated in FIGS. 1 and 2A-2C, 3A-3C, 4A-4C, or 5A-5C, the polarizers 100A and 100B could be configured with at least two differently shaped waveguides at different design levels including a first waveguide 110 and a second waveguide 120 with an outer end 121 diagonally offset and evanescently coupled to a main body 113 of the first waveguide 110. However, in each of these polarizers 100A and 100B, the main body 113 of the first waveguide 110 has a different thickness than the input and output ends 111-112 (when viewed from above and in a direction perpendicular to the first waveguide 110). Specifically, in the polarizer 100A of FIG. 6A, the main body 113 of the first waveguide 110 is relatively thick as compared to the input and output ends 111-112 (when viewed from above and in a direction perpendicular to the first waveguide 110). In the polarizer 100B of FIG. 6B, the main body 113 of the first waveguide 110 is relatively thin as compared to the input and output ends 111-112 (when viewed from above and in a direction perpendicular to the first waveguide 110).

Figure 6D:
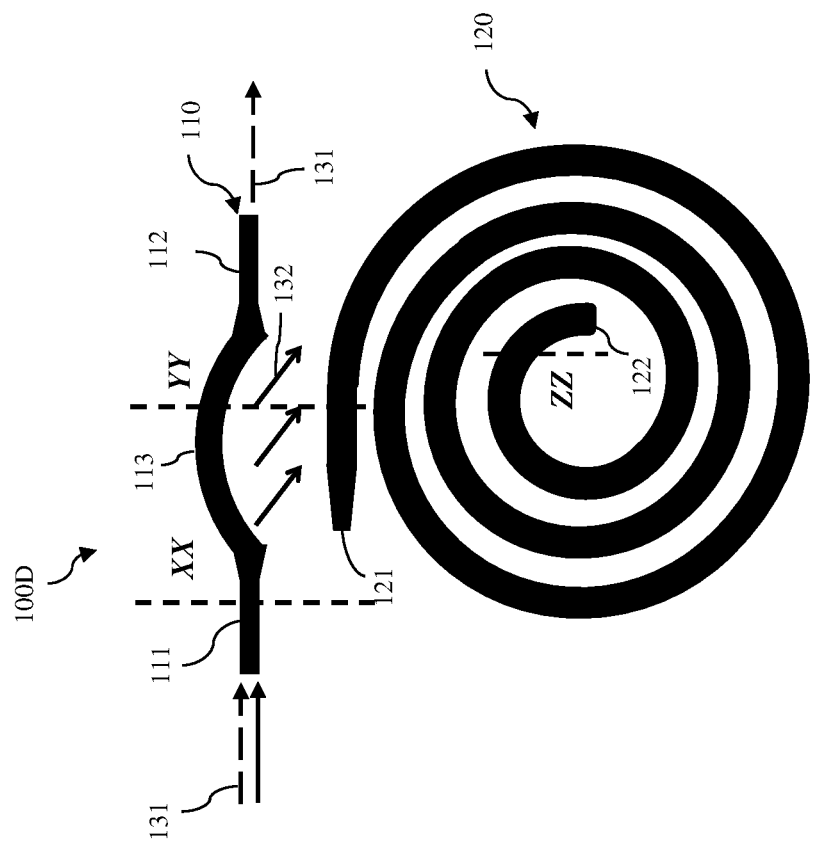
Figure 6C:
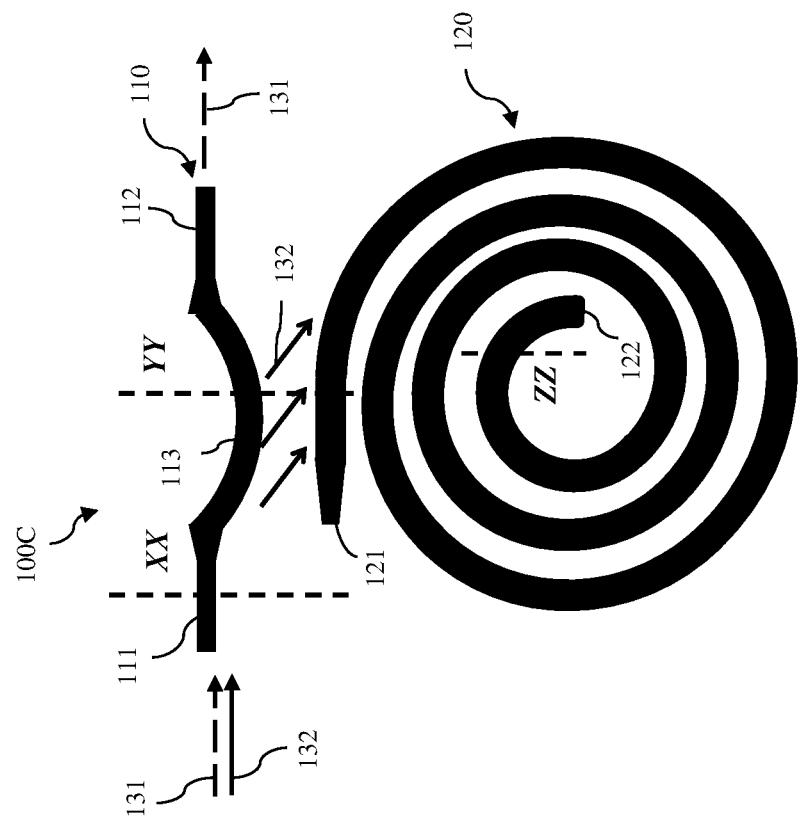

Additionally, in the polarizer 100 of FIG. 1, the first waveguide 110 is shown as being essentially linear across its length from the input end 111 to the output end 112 (when viewed from above). FIGS. 6C and 6D are top-down views illustrating a photonic integrated circuit (PIC) chip with on-chip polarizers 100C and 100D, respectively. As in the embodiments described above and illustrated in FIGS. 1 and 2A-2C, 3A-3C, 4A-4C, or 5A-5C, the polarizers 100A and 100B could be configured with at least two differently shaped waveguides at different design levels including a first waveguide 110 and also a second waveguide 120 with an outer end 121 diagonally offset and evanescently coupled to a main body 113 of the first waveguide 110. However, in each of these polarizers 100C and 100D, the main body 113 of the first waveguide 110 is curved as opposed to being essentially linear (when viewed from above). Specifically, in the polarizer 100C of FIG. 6C, the main body 113 of the first waveguide 110 is curved toward the outer end 121 of the second waveguide 120. In the polarizer 100D of FIG. 6D, the main body 113 of the first waveguide 110 is curved away from the outer end 121 of the second waveguide 120.

Additionally, as mentioned above, in the embodiments described above and illustrated in FIGS. 1 and 2A-2C, 3A-3C, 4A-4C, 5A-5C, or 6A-6D, the polarizer can include at least two differently shaped waveguides in different design levels. While these figures only show one first waveguide 110 and one second waveguide 120, they are not intended to be limiting. In some embodiments disclosed herein, the polarizer could include multiple first waveguides and/or multiple second waveguides.

Figure 6E:
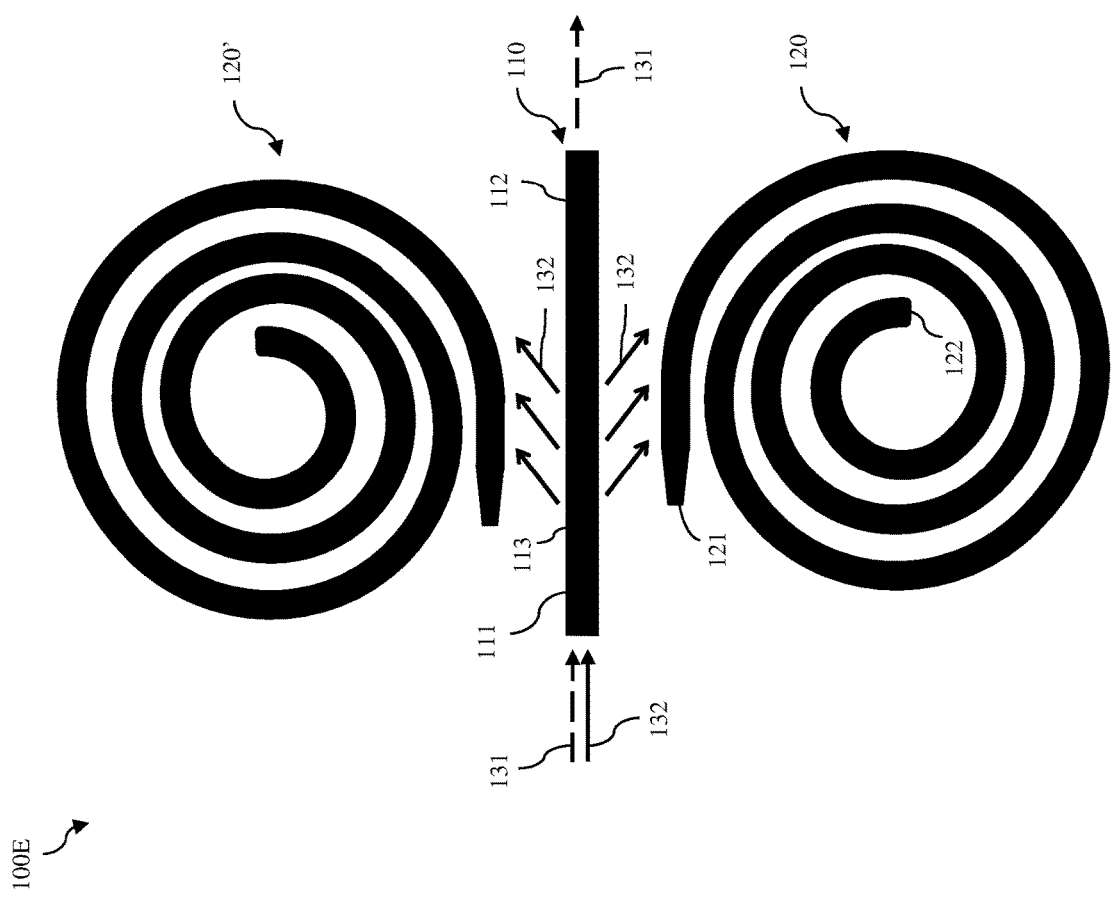

For example, FIG. 6E is a top-down view illustrating a photonic integrated circuit (PIC) chip with on-chip polarizer 100E. In this embodiment, the on-chip polarizer 100E includes multiple differently shaped waveguides at different design levels. These waveguides can include a first waveguide 110 with an input end 111, an output end 112 opposite the input end and an elongated main body 113 extending between the input end 111 and the output end 112. The waveguides can also include two second waveguides 120, 120' on opposing sides of the first waveguide 110. Like in the previously described embodiments, each second waveguide 120 can be spiral in shape with an outer end 121 and an inner end 122. The outer end 121 of each second waveguide 120 can be diagonally offset from and evanescently coupled to the main body 113 of the first waveguide 110. With this configuration, light signals, including first light signals 131 with a first type polarization and second light signals 132 with a second type polarity, can be received at the input end 111 of the first waveguide 110. The first waveguide 110 can pass the first light signals 131 through the main body 113 to and out the output end 112. The first waveguide 110 can further pass at least a portion of the second light signals 132 out the main body and into the outer end 121 of each second waveguide 120. Finally, each second waveguide 120 can attenuate the received second light signals 132 as they pass from its outer end 121 toward its inner end 122.

Figure 6F:
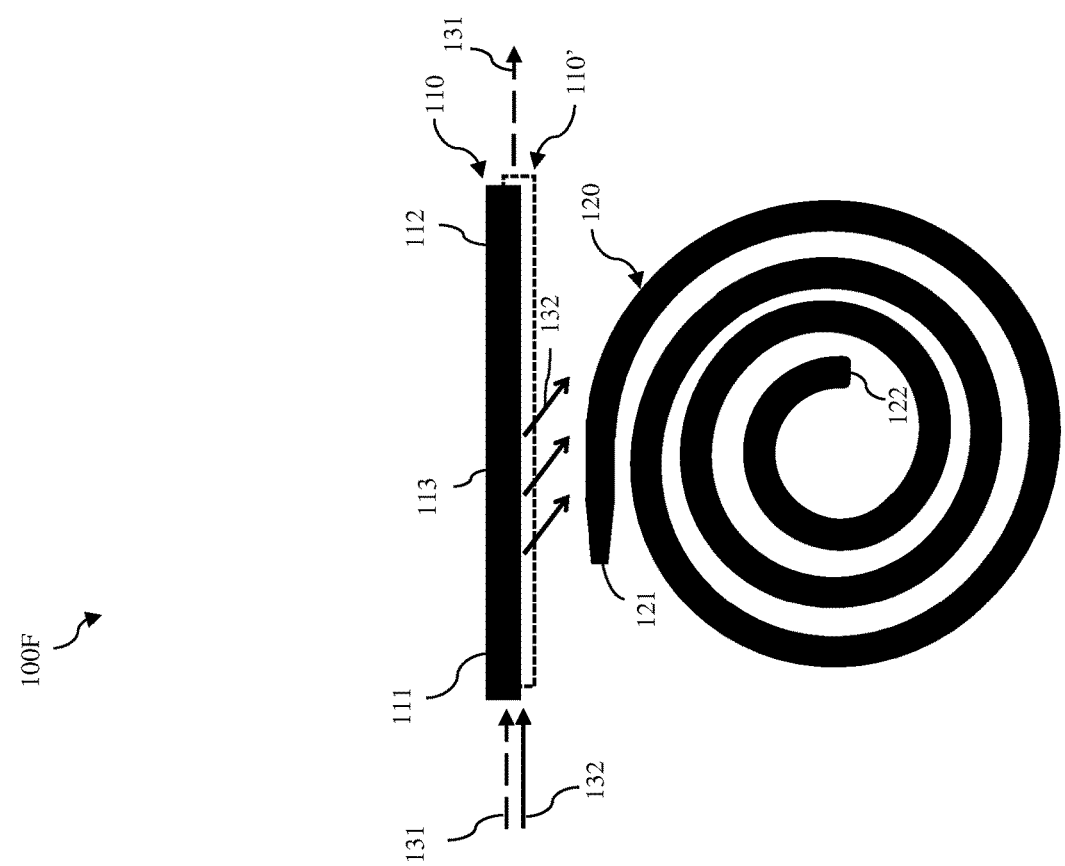

FIG. 6F is a top-down view illustrating a photonic integrated circuit (PIC) chip with on-chip polarizer 100F. In this embodiment, the on-chip polarizer 100F includes multiple differently shaped waveguides at different design levels. These waveguides can include a first waveguide 110 with an input end 111, an output end 112 opposite the input end and an elongated main body 113 extending between the input end 111 and the output end 112. The waveguides can also include a second waveguide 120 that is spiral in shape with an outer end 121 and an inner end 122. The outer end 121 of the second waveguide 120 can be diagonally offset from and evanescently coupled to the main body 113 of the first waveguide 110. As in all of the previously described embodiments, the first waveguide 110 and the second waveguide 120 can be a different design levels. In this case, the waveguides can further include an additional first waveguide 110' in a different design level and aligned vertically with the first waveguide 110. That is, the waveguides can include stacked first waveguides 110 and 110'. With this configuration, the stacked first waveguides 110, 110' enhance confinement of the first light signals 131 therein and minimize unwanted cross-talk.

Figure 6G:
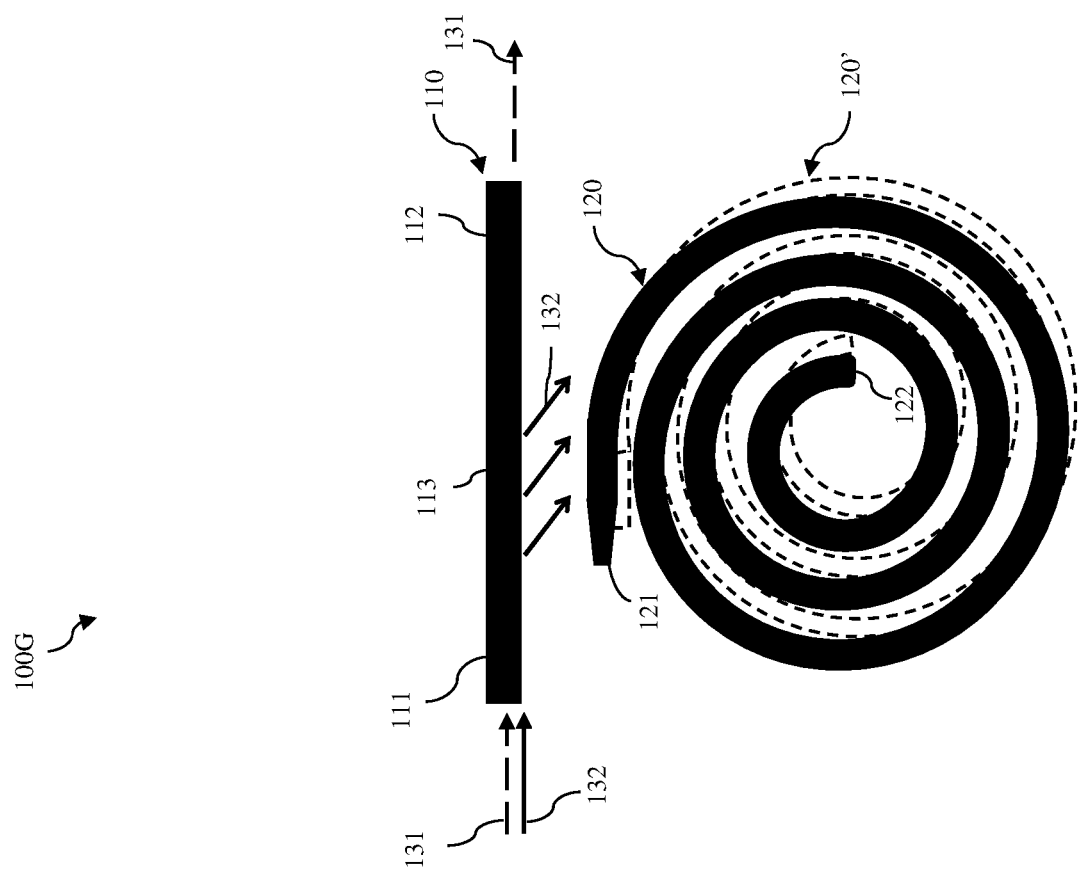

FIG. 6G is a top-down view illustrating a photonic integrated circuit (PIC) chip with on-chip polarizer 100G. In this embodiment, the on-chip polarizer 100G includes multiple differently shaped waveguides at different design levels. These waveguides can include a first waveguide 110 with an input end 111, an output end 112 opposite the input end and an elongated main body 113 extending between the input end 111 and the output end 112. The waveguides can also include a second waveguide 120 that is spiral in shape with an outer end 121 and an inner end 122. The outer end 121 of the second waveguide 120 can be diagonally offset from and evanescently coupled to the main body 113 of the first waveguide 110. As in all of the previously described embodiments, the first waveguide 110 and the second waveguide 120 can be a different design levels. In this case, the waveguides can further include an additional second waveguide 120' in a different design level and aligned vertically with the second waveguide 120. That is, the waveguides can include stacked second waveguides 120, 120'. With this configuration, the stacked second waveguides 120, 120' enhance filtering and attenuation the second light signals 132.

Figure 6H:
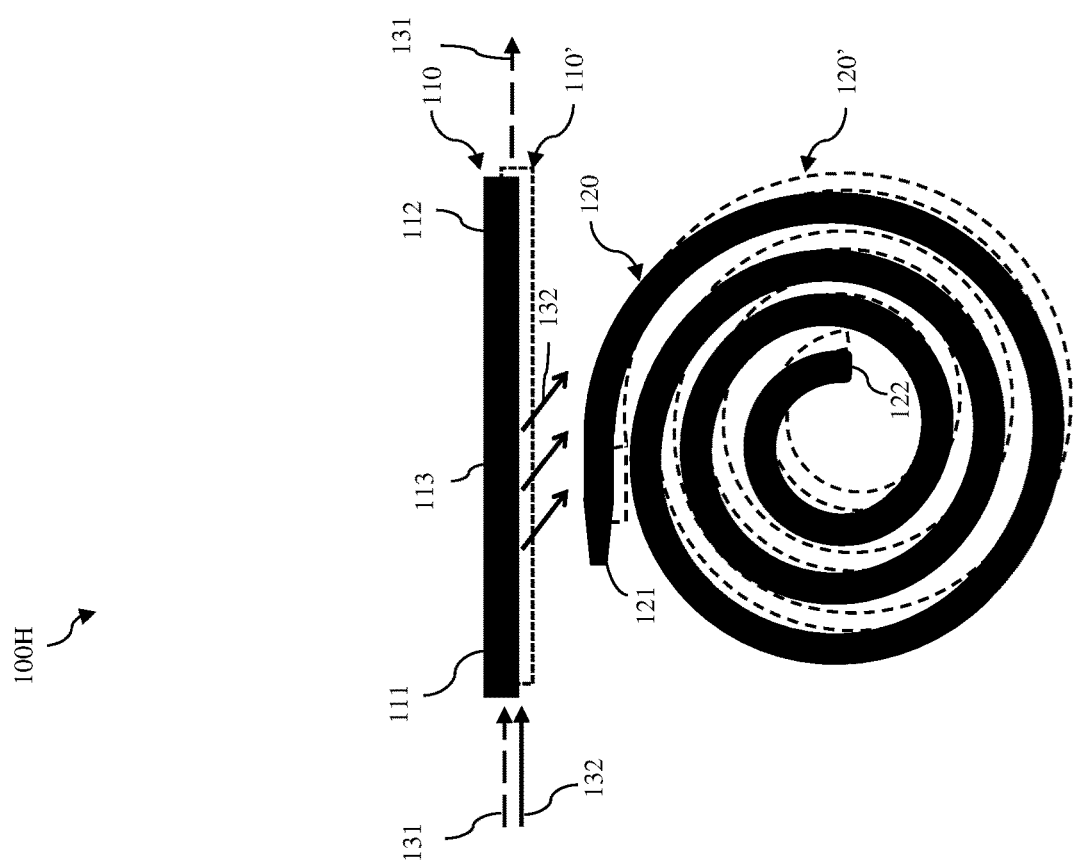

FIG. 6H is a top-down view illustrating a photonic integrated circuit (PIC) chip with on-chip polarizer 100H. In this embodiment, the on-chip polarizer 100F includes multiple differently shaped waveguides at different design levels. These waveguides can include a first waveguide 110 with an input end 111, an output end 112 opposite the input end and an elongated main body 113 extending between the input end 111 and the output end 112. The waveguides can also include a second waveguide 120 that is spiral in shape with an outer end 121 and an inner end 122. The outer end 121 of the second waveguide 120 can be diagonally offset from and evanescently coupled to the main body 113 of the first waveguide 110. As in all of the previously described embodiments, the first waveguide 110 and the second waveguide 120 can be a different design levels. In this case, the waveguides can further include at least one additional first waveguide 110' in a different design level and aligned vertically with the first waveguide 110. That is, the waveguides can include stacked first waveguides 110, 110'. Additionally, the waveguides can further include at least one additional second waveguide 120' in a different design level and aligned vertically with the second waveguide 120. That is, the waveguides can include stacked second waveguides 120, 120'. In this embodiment with stacked first waveguides and stacked second waveguides, the different design levels used for the stacked first waveguides and the stacked second waveguides can be the same or different. For example, the first and second waveguides could be in the active device level and additional first and second waveguides could be in a metal level. Alternatively, the stacked first waveguides could be in a FEOL active device level and a lower BEOL metal level and the stacked second waveguides could be in a FEOL polysilicon level and an upper BEOL metal level or vice versa. In any case, with this configuration, the stacked first waveguides 110, 110' enhance confinement of the first light signals 131 therein and minimize unwanted cross-talk and the stacked second waveguides 120, 120' enhance filtering and attenuation of the second light signals 132.

It should be understood that the various features described above as being incorporated into specific embodiments could, optionally, be combined to form other polarizer embodiments that are not shown in the Figures. For example, while not specifically shown in the FIGS. 6A-6D, the the main body 113 of the first waveguide 110 could be thinner or thicker than the input and output ends 111-113 (as in FIG. 6A or 6B) and could be curved toward or away from the outer end 121 of the second waveguide 120 (as in FIG. 6C or 6D). Additionally, while not specifically shown in the FIG. 6E, the main body 113 of the first waveguide 110 could be thinner or thicker than the input and output ends 111-113 (as in FIG. 6A or 6B) and/or curved (as in FIG. 6C or 6D). Furthermore, although FIGS. 6F-6H show the stacked first waveguides as being identical in size and shape and the stacked second waveguides as also being essentially identical in size and shape, there could be differences between the first waveguides and/or between the second waveguides.

It should be noted that the above-described variations between the embodiments can be employed alone and/or in combination in order to maximize the filtering capacity of the polarizer and, particularly, to increase the likelihood that the light signals output at the output end 112 of the first waveguide 110 are primarily first light signals 131 having the first type polarization and so that the light signals received by the outer end 121 of the second waveguide 120 and subsequently attenuated are primarily second light signals with the second type polarization. This can be accomplished by designing the first waveguide 110 and the second waveguide 120 and positioning the main body 113 of the first waveguide 110 relative to the outer end 121 of the second waveguide so that the phase matching conditions between the waveguides are optimal for the second light signals 132 but not for the first light signals 131. Because the phase matching conditions are optimal for the second light signals 132 but not the first light signals 131, the second light signals 132 pass from the first waveguide 110 into the second waveguide 120 but the first light signals 131 do not.

Such a polarizer can be configured either as a transverse electric (TE)-pass polarizer (i.e., where the first light signals 131 that are output by the first waveguide 110 have TE-type polarization and the second light signals 132 that are filtered out have transverse magnetic (TM)-type polarization) or, alternatively, as a transverse magnetic (TM)-pass polarizer (i.e., where the first light signals 131 that are output by the first waveguide 110 have TM-type polarization and the second light signals 132 that are filtered out have TE-type polarization). In other words, for a TE-pass polarizer, the phase matching conditions between first waveguide 110 (i.e., the bus waveguide) in the TM-mode and the second waveguide 120 (i.e., the spiral waveguide) also in the TM-mode can be satisfied. As a result, the evanescent coupling between the main body 113 of the first waveguide 110 and the outer end 121 of the second waveguide 120 will ensure that light signals in the TM-mode are passed into the second waveguide 120 and attenuated. Furthermore, since phase matching between the first waveguide 110 and the second waveguide 120 in the TE-mode is not satisfied, light signals in the TE-mode travel through the main body 113 to the output end 112 of the first waveguide 110 without coupling to or being impacted by the second waveguide 120. Alternatively, for a TM-pass polarizer, the phase matching conditions between first waveguide 110 (i.e., the bus waveguide) in the TE-mode and the second waveguide 120 (i.e., the spiral waveguide) also in the TE-mode can be satisfied. As a result, the evanescent coupling between the main body 113 of the first waveguide 110 and the outer end 121 of the second waveguide 120 will ensure that light signals in the TE-mode are passed into the second waveguide 120 and attenuated. Furthermore, since phase matching between the first waveguide 110 and the second waveguide 120 in the TM-mode is not satisfied, light signals in the TM-mode travel through the main body 113 to the output end 112 of the first waveguide 110 without coupling to or being impacted by the second waveguide 120.

Figure 7:
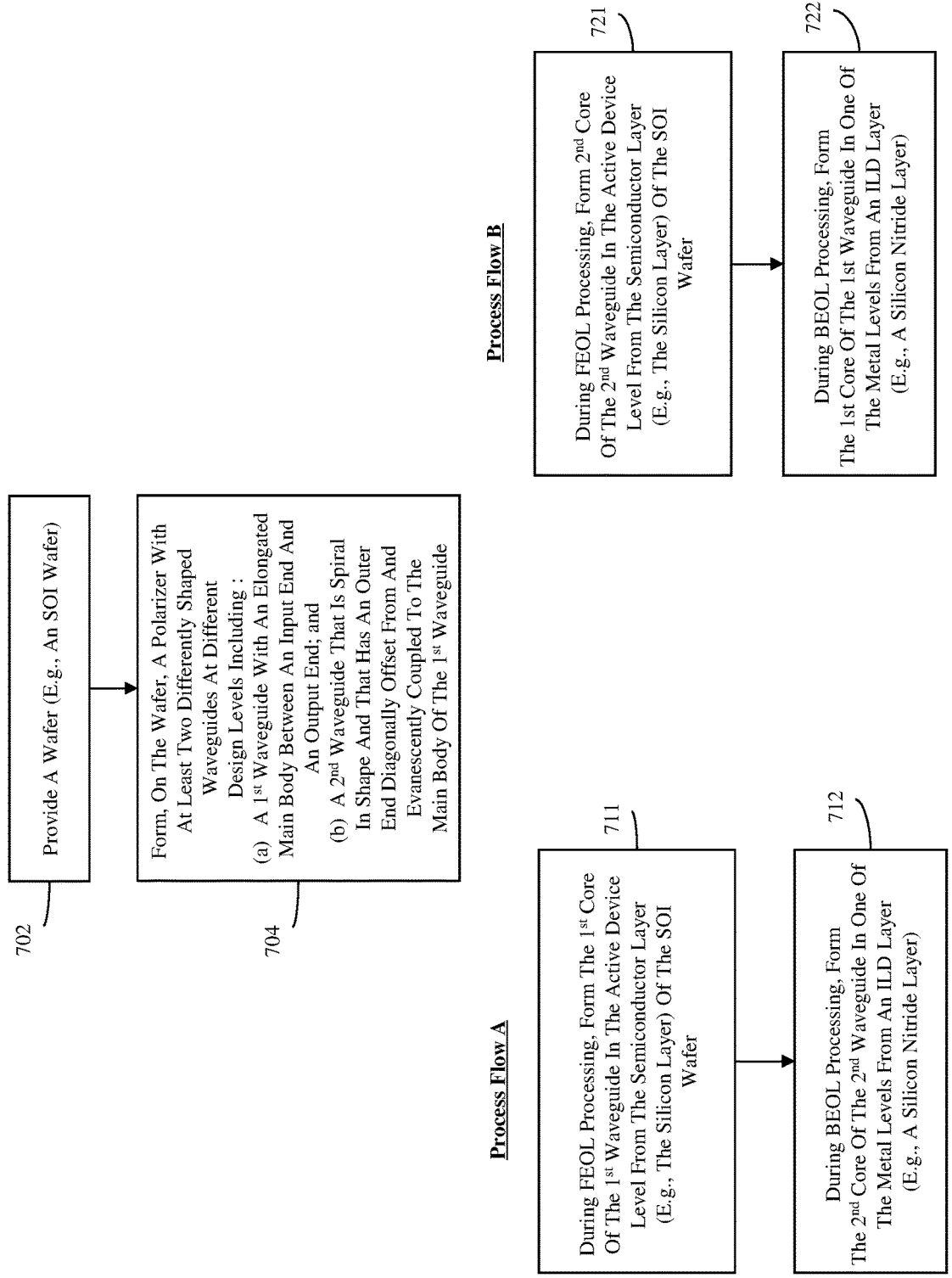
FIG. 7 is a flow diagram illustrating disclosed method embodiments for forming a PIC chip with an on-chip polarizer.

Referring to the flow diagram of FIG. 7, also disclosed herein are embodiments of a method of forming an photonic integrated circuit (PIC) chip with an on-chip polarizer 100, as described in detail above and illustrated in FIG. 1, or with any of the other on-chip polarizers 100A-100H, as described in detail above and illustrated in FIGS. 6A-6H, respectively.

The method embodiments can include providing a semiconductor wafer (see process step 702). The wafer can be, for example, a semiconductor-on-insulator wafer that includes a semiconductor substrate (e.g., a silicon substrate), an insulator layer (e.g., a buried oxide layer) on the semiconductor substrate, and a monocrystalline semiconductor layer (e.g., a monocrystalline silicon layer) on the insulator layer.

The method can further include forming, on the wafer above the substrate, a polarizer 100 (or, alternatively, a polarizer 100A-100H) (see process step 704). In any case, this polarizer can be formed so as to have at least two differently shaped waveguides at different design levels (e.g., in the active device level and in a metal level above the active device level or in any other suitable combination of design levels). Specifically, the polarizer 100 (or, alternatively, 100A-100H) can be formed at process step 704 such that it includes multiple waveguides include both a first waveguide 110 and a second waveguide 120. The first waveguide 110 can be formed so as to have an input end 111, an output end 112 opposite the input end 111 and an elongated main body 113 extending between the input end 111 and the output end 112. The second waveguide 120 can be formed so as to be spiral in shape with an outer end 121 and an inner end 122. Furthermore, these first and second waveguides 110 and 120 can be formed at process step 704 such that the outer end 121 of the second waveguide 120 is diagonally offset from and evanescently coupled to the main body 113 of the first waveguide 110.

In some embodiments (e.g., see Process Flow A and also FIGS. 2A-2C and 3A-3C), the polarizer 100 (or, alternatively, the polarizers 100A-100H) can be formed at process step 704 as follows. During front end of the line (FEOL) processing, the first waveguide 110 can be formed in a FEOL design level 181 and, particularly, in the active device level (see process step 711). Specifically, the first core of the first waveguide 110 can be formed in (e.g., lithographically patterned and etched into) the semiconductor layer 196 (e.g., the silicon layer) of the wafer so that it is a semiconductor material core (e.g., a silicon core). The first core can specifically be lithographically patterned so that the first waveguide 110 will have an input end 111, an output end, and the main body 113 that extends from the input end 111 and to the output end on a flat plane. As illustrated in FIGS. 2A-2B, the etch process can be timed such that the first core is the full thickness of the semiconductor layer 196. Alternatively, as illustrated in FIGS. 3A-3B, the etch process can be timed such that the first core is only patterned into the upper portion of the semiconductor layer 196. During middle of the line (MOL) processing, the first core can be covered with dielectric material layers 192. Thus, the first cladding material surrounding the first core includes the insulator material of the insulator layer 191 adjacent to the bottom surface of the first core and also the dielectric material layers 192 of the MOL design level 182 adjacent to the top and side surfaces of the first core.

Subsequently, during back end of the line (BEOL) processing, the second waveguide 120 can be formed in a BEOL design level 183 and, particularly, in one of the metal levels above the active device level (see process step 712). Specifically, the second core of the second waveguide 120 can be formed in (e.g., lithographically patterned and etched into) one specific interlayer dielectric (ILD) layer 197 (e.g., a silicon nitride layer) on another ILD layer (e.g., a silicon oxide layer) so that it is a dielectric material core (e.g., a silicon nitride core). The second core can specifically be lithographically patterned so that the second waveguide 120 will be spiral in shape with a gradually tightening curve from an outer end 121 to an inner end 122 (or center point) on a flat plane. As illustrated in FIGS. 2B-2C, the etch process can be timed so that the second core is the full thickness of the ILD layer 197. Alternatively, as illustrated in FIGS. 3B-3C, the etch process can be timed so that the second core is only patterned into the upper portion of the ILD layer 197. As illustrated in FIG. 2B (or FIG. 3B), the second core can further be lithographically patterned so that the outer end 121 of the second waveguide 120 is diagonally offset from and evanescently coupled to the main body 113 of the first waveguide 110 in the active device level below. During subsequent BEOL processing, another ILD layer (e.g., silicon oxide layer) can be deposited over the top and side surfaces of the second core. Thus, the second cladding material surrounding the second core of the second waveguide 120 includes different ILD layers (e.g., silicon oxide layers) adjacent to the bottom, top and side surfaces of the second core.

In other embodiments (e.g., see Process Flow B and also FIGS. 4A-4C and 5A-5C), the polarizer 100 (or, alternatively, the polarizers 100A-100H) can be formed at process step 704 as follows. During FEOL processing, the second waveguide 120 can be formed in a FEOL design level 181 and, particularly, in the active device level (see process step 721). Specifically, the second core of the second waveguide 120 can be formed in (e.g., lithographically patterned and etched into) the semiconductor layer 196 (e.g., the silicon layer) of the wafer so that it is a semiconductor material core (e.g., a silicon core). The second core can be lithographically patterned so that the second waveguide 120 will be spiral in shape with a gradually tightening curve from an outer end 121 to an inner end 122 (or center point) on a flat plane. As illustrated in FIGS. 4B-4C, the etch process can be timed such that the second core is the full thickness of the semiconductor layer 196. Alternatively, as illustrated in FIGS. 5B-5C, the etch process can be timed such that the second core is only patterned into the upper portion of the semiconductor layer 196. During middle of the line (MOL) processing, the second core can be covered with dielectric material layers 192. Thus, the second cladding material surrounding the second core of the second waveguide 120 includes the insulator material of the insulator layer 191 adjacent to the bottom surface of the second core and also the dielectric material layers 192 of the MOL design level 182 adjacent to the top and side surfaces of the second core.

Subsequently, during BEOL processing, the first waveguide 110 can be formed in a BEOL design level 183 and, particularly, in one of the metal levels above the active device level (see process step 722). Specifically, the first core of the first waveguide 110 can be formed in (e.g., lithographically patterned and etched into) one specific BEOL interlayer dielectric (ILD) layer 197 (e.g., a silicon nitride layer) on another one of the BEOL ILD layers 195 (e.g., a silicon oxide layer) so that it is a dielectric material core (e.g., a silicon nitride core). The first core can specifically be lithographically patterned so that the first waveguide 110 will have an input end 111, an output end, and the main body 113 that extends from the input end 111 and to the output end on a flat plane. As illustrated in FIGS. 4A-4B, the etch process can be timed so that the first core is the full thickness of the ILD layer 197. Alternatively, as illustrated in FIGS. 5A-5B, the etch process can be timed so that the first core is only patterned into the upper portion of the ILD layer 197. As illustrated in FIG. 4B (or FIG. 5B), the first core can further be lithographically patterned so that the outer end 121 of the second waveguide 120 in the active device level below is diagonally offset from and evanescently coupled to the main body 113 of the first waveguide 110. During subsequent BEOL processing, another one of the BEOL ILD layers 195 (e.g., silicon oxide layer) can be deposited over the top and side surfaces of the first core. Thus, the first cladding material surrounding the first core of the first waveguide 110 includes different ILD layers (e.g., silicon oxide layers) adjacent to the bottom, top and side surfaces of the first core.

It should be noted that the lithographic patterning process used to form the first waveguide 110 in either process step 711 of Process Flow A or in process step 722 of Process Flow B can be performed so that the main body 113 has the same thickness as the input and output ends 111-112 (as shown in FIG. 1), so that the main body 113 is thicker than the input and output ends (as shown in FIG. 6A) or so that the main body 113 is thinner than the input and output ends (as shown in FIG. 6B). Additionally or alternatively, the lithographic patterning process used to form the first waveguide 110 in either process step 711 of Process Flow A or in process step 722 of Process Flow B can be performed so that the main body 113 is essentially linear (as shown in FIG. 1), curved toward the second waveguide 120 (as shown in FIG. 6C) or curved away from the second waveguide 120 (as shown in FIG. 6D).

As mentioned above, the process of forming the polarizer includes forming at least two differently shaped waveguides at different design levels. Thus, in addition to forming the first and second waveguides according to Process Flow A or Process Flow B, one or more additional waveguides (e.g., an additional first waveguide and/or an additional second waveguide) could be integrated into the process flows. For example, during formation of the second waveguide at process step 712 of Process Flow A or at process step 721 of Process Flow B, an additional second waveguide 120' could be formed on the opposite side of the first waveguide 110 (as shown in FIG. 6E). Additionally or alternatively, process steps 711 and 721 and/or process steps 712 and 722 could be concurrently performed so to formed stacked first waveguides and/or stacked second waveguides (as shown in FIGS. 6F-6H).

Forming the polarizer 100 (or, alternatively, 100A-100H) in this manner ensures that, when light signals, including first light signals 131 with a first type polarization and second light signals 132 with a second type polarity, are received at the input end 111 of the first waveguide 110, the first waveguide 110 passes the first light signals 131 through the main body to the output end 112, the first waveguide 110 passes at least a portion of the second light signals 132 out the main body and into the outer end 121 of the second waveguide 120 and the second waveguide 120 attenuates the received second light signals as they pass from its outer end 121 toward its inner end 122.

It should be noted that the above-described method embodiments include making adjustments to the polarizer design (e.g., adjusting the thickness of the main body 113 of the waveguide, the shape of the main body 113 of the first waveguide 110, changing the design levels, etc.) in order to maximize the filtering capacity of the polarizer 100 and, particularly, to increase the likelihood that the light signals output at the output end 112 of the first waveguide 110 are primarily first light signals 131 having the first type polarization and so that the light signals received by the outer end 121 of the second waveguide 120 and subsequently attenuated are primarily second light signals with the second type polarization. This can be accomplished by designing the first waveguide 110 and the second waveguide 120 and positioning the main body 113 of the first waveguide 110 relative to the outer end 121 of the second waveguide so that the phase matching conditions between the waveguides are optimal for the second light signals 132 but not for the first light signals 131. Because the phase matching conditions are optimal for the second light signals 132 but not the first light signals 131, the second light signals 132 pass from the first waveguide 110 into the second waveguide 120 but the first light signals 131 do not.

Such a polarizer can be configured either as a transverse electric (TE)-pass polarizer (i.e., where the first light signals 131 that are output by the first waveguide 110 have TE-type polarization and the second light signals 132 that are filtered out have transverse magnetic (TM)-type polarization) or, alternatively, as a transverse magnetic (TM)-pass polarizer (i.e., where the first light signals 131 that are output by the first waveguide 110 have TM-type polarization and the second light signals 132 that are filtered out have TE-type polarization). In other words, for a TE-pass polarizer, the phase matching conditions between first waveguide 110 (i.e., the bus waveguide) in the TM-mode and the second waveguide 120 (i.e., the spiral waveguide) also in the TM-mode can be satisfied. As a result, the evanescent coupling between the main body 113 of the first waveguide 110 and the outer end 121 of the second waveguide 120 will ensure that light signals in the TM-mode are passed into the second waveguide 120 and attenuated. Furthermore, since phase matching between the first waveguide 110 and the second waveguide 120 in the TE-mode is not satisfied, light signals in the TE-mode travel through the main body 113 to the output end 112 of the first waveguide 110 without coupling to or being impacted by the second waveguide 120. Alternatively, for a TM-pass polarizer, the phase matching conditions between first waveguide 110 (i.e., the bus waveguide) in the TE-mode and the second waveguide 120 (i.e., the spiral waveguide) also in the TE-mode can be satisfied. As a result, the evanescent coupling between the main body 113 of the first waveguide 110 and the outer end 121 of the second waveguide 120 will ensure that light signals in the TE-mode are passed into the second waveguide 120 and attenuated. Furthermore, since phase matching between the first waveguide 110 and the second waveguide 120 in the TM-mode is not satisfied, light signals in the TM-mode travel through the main body 113 to the output end 112 of the first waveguide 110 without coupling to or being impacted by the second waveguide 120. Specific design techniques for configuring two evanescently coupled waveguides to satisfy phase matching conditions for either the TM or TE modes are known in the art and, thus, the details have been omitted from this specification in order to allow the reader to focus on the salient features of the disclosed embodiments.

It should be understood that the terminology used herein is for the purpose of describing the disclosed structures and methods and is not intended to be limiting. For example, as used herein, the singular forms "a", "an" and "the" are intended to include the plural forms as well, unless the context clearly indicates otherwise. Additionally, as used herein, the terms "comprises" "comprising", "includes" and/or "including" specify the presence of stated features, integers, steps, operations, elements, and/or components, but do not preclude the presence or addition of one or more other features, integers, steps, operations, elements, components, and/or groups thereof. Furthermore, as used herein, terms such as "right", "left", "vertical", "horizontal", "top", "bottom", "upper", "lower", "under", "below", "underlying", "over", "overlying", "parallel", "perpendicular", etc., are intended to describe relative locations as they are oriented and illustrated in the drawings (unless otherwise indicated) and terms such as "touching", "in direct contact", "abutting", "directly adjacent to", "immediately adjacent to", etc., are intended to indicate that at least one element physically contacts another element (without other elements separating the described elements). The term "laterally" is used herein to describe the relative locations of elements and, more particularly, to indicate that an element is positioned to the side of another element as opposed to above or below the other element, as those elements are oriented and illustrated in the drawings. For example, an element that is positioned laterally adjacent to another element will be beside the other element, an element that is positioned laterally immediately adjacent to another element will be directly beside the other element, and an element that laterally surrounds another element will be adjacent to and border the outer sidewalls of the other element. The corresponding structures, materials, acts, and equivalents of all means or step plus function elements in the claims below are intended to include any structure, material, or act for performing the function in combination with other claimed elements as specifically claimed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An photonic integrated circuit chip comprising:
a substrate; and
a polarizer on the substrate and comprising differently shaped waveguides at different levels, wherein the waveguides comprise at least:
a first waveguide having an input end, an output end opposite the input end, and a main body between the input end and the output end; and
a second waveguide having a spiral shape with an outer end and an inner end, wherein the outer end is evanescently coupled to the main body of the first waveguide.

2. The photonic integrated circuit chip of claim 1,
wherein the first waveguide receives light signals at the input end,
wherein the light signals comprise first light signals with a first type polarization and second light signals with a second type polarization,
wherein the first waveguide passes the first light signals out the output end and further passes at least a portion of the second light signals out the main body into the outer end of the second waveguide, and
wherein the second waveguide attenuates received second light signals between the outer end and the inner end.

3. The photonic integrated circuit chip of claim 1, wherein the main body of the first waveguide has a different thickness than the input end and the output end.

4. The photonic integrated circuit chip of claim 1, wherein the main body of the first waveguide is one of the following:
essentially linear;
curved toward the outer end of the second waveguide; and
curved away from the outer end of the second waveguide.

5. The photonic integrated circuit chip of claim 1, wherein the outer end of the second waveguide is diagonally offset from the main body of the first waveguide.

6. The photonic integrated circuit chip of claim 1,
wherein the first waveguide is in an active device level and a semiconductor material core, and
wherein the second waveguide is in a metal level above the active device level and has a dielectric material core.

7. The photonic integrated circuit chip of claim 1,
wherein the first waveguide is in an active device level and has a silicon core, and
wherein the second waveguide is in a metal level above the active device level and has a silicon nitride core.

8. The photonic integrated circuit chip of claim 1,
wherein the second waveguide is in an active device level and has a semiconductor material core, and
wherein the first waveguide is in a metal level above the active device level and has a dielectric material core.

9. The photonic integrated circuit chip of claim 1,
wherein the second waveguide is in an active device level and has a silicon core, and
wherein the first waveguide is in a metal level above the active device level and has a silicon nitride core.

10. The photonic integrated circuit chip of claim 1, wherein a core of at least one of the waveguides comprises a thick portion of a material layer and wherein a thin portion of the material layer extends laterally beyond the thick portion.

11. The photonic integrated circuit chip of claim 1, wherein the waveguides further comprise any of the following:
an additional first waveguide aligned vertically with the first waveguide; and
an additional second waveguide aligned vertically with the second waveguide.

12. A photonic integrated circuit chip comprising:
a substrate; and
a polarizer on the substrate and comprising differently shaped waveguides at different levels, wherein the waveguides comprise at least:

a first waveguide having an input end, an output end opposite the input end, and a main body between the input end and the output end; and multiple second waveguides on opposing sides of the first waveguide, wherein each second waveguide has a spiral shape with an outer end and an inner end and wherein the outer end of each second waveguide is evanescently coupled to the main body of the first waveguide.

13. A method of forming a photonic integrated circuit chip, the method comprising:

providing a substrate; and forming, on the substrate, a polarizer comprising differently shaped waveguides at different levels such that the waveguides comprise at least:

a first waveguide having an input end, an output end opposite the input end, and a main body between the input end and the output end; and at least one second waveguide having a spiral shape with an outer end and an inner end, wherein the outer end is evanescently coupled to the main body of the first waveguide.

14. The method of claim 13, wherein the forming of the polarizer comprises forming the waveguides so that, when the first waveguide receives light signals comprising first light signals with a first type polarization and second light signals with a second type polarization, the first waveguide passes the first light signals out the output end and passes at least a portion of the second light signals out the main body into the outer end of the second waveguide and the second waveguide attenuates received second light signals between the outer end and the inner end.

15. The method of claim 13, wherein the forming of the polarizer comprises forming the waveguides so that the main body of the first waveguide has a different thickness than the input end and the output end.

16. The method of claim 13, wherein the forming of the polarizer comprises forming the waveguides so that the main body of the first waveguide is one of the following:

essentially linear;

curved toward the outer end of the second waveguide; and curved away from the outer end of the second waveguide.

17. The method of claim 13, wherein the forming of the polarizer comprises forming the waveguides so that the outer end of the second waveguide is diagonally offset from the main body of the first waveguide.

18. The method of claim 13, wherein the forming of the polarizer comprises:

forming the first waveguide in an active device level so as to have a semiconductor material core; and forming the second waveguide in a metal level above the active device level so as to have a dielectric material core.

19. The method of claim 13, wherein the forming of the polarizer comprises:

forming the second waveguide in an active device level and having a semiconductor material core; and forming the first waveguide in a metal level above the active device level and having a dielectric material core.

20. The method of claim 13, wherein the forming of the polarizer comprises:

forming the waveguides so as to include at least one of stacked first waveguides and stacked second waveguides.

* * * * *